(12) United States Patent
Engle et al.

(10) Patent No.: US 6,691,125 B1
(45) Date of Patent: Feb. 10, 2004

(54) METHOD AND APPARATUS FOR CONVERTING FILES STORED ON A MAINFRAME COMPUTER FOR USE BY A CLIENT COMPUTER

(75) Inventors: Bruce Engle, San Francisco, CA (US); Kevin Parker, Danville, CA (US)

(73) Assignee: Serena Software, Inc., San Mateo, CA (US)

( * ) Notice: Subject to any disclaimer, the term of this patent is extended or adjusted under 35 U.S.C. 154(b) by 0 days.

(21) Appl. No.: 09/442,018

(22) Filed: Nov. 17, 1999

(51) Int. Cl.[7] ............................................... G06F 17/00
(52) U.S. Cl. ..................... 707/102; 707/200; 707/101; 709/200; 709/217
(58) Field of Search .............. 707/1–206; 709/200–207, 709/212–219

(56) References Cited

U.S. PATENT DOCUMENTS

| | | | |
|---|---|---|---|
| 5,146,561 A | | 9/1992 | Carey et al. |
| 5,390,318 A | | 2/1995 | Ramakrishnan et al. |
| 5,857,203 A | | 1/1999 | Kauffman et al. |
| 5,878,228 A | | 3/1999 | Miller et al. |
| 5,893,116 A | | 4/1999 | Simmonds et al. |
| 5,944,789 A | | 8/1999 | Tzelnic et al. |
| 5,948,062 A | | 9/1999 | Tzelnic et al. |
| 5,956,712 A | | 9/1999 | Bennett et al. |
| 5,974,391 A | * | 10/1999 | Hongawa ..................... 707/100 |
| 6,061,714 A | | 5/2000 | Housel, III et al. |
| 6,189,006 B1 | * | 2/2001 | Fukushima ..................... 707/6 |
| 6,192,408 B1 | | 2/2001 | Vahalia et al. |
| 6,199,107 B1 | | 3/2001 | Dujari |
| 6,389,460 B1 | * | 5/2002 | Stewart et al. ............. 707/104.1 |

OTHER PUBLICATIONS

Bassiouni et al., Efficient coding for integrated information systems and multimedia databases, Computer Software and Applications Conference, 1989, COMPSAC 89, Proceedings of the 13th Annual International, Sep. 20–22, 1989, pp. 308–315.*

Sunaga et al., Applicability evaluation of service feature enhancement using the partial–file "Plug–in" modification technique, Communications, 1996, ICC 96, Conference Record, Converging Tecnologies for Tommorrow's Applications, 1996 IEEE International Co.*

Song et al., The clustering property of corner transformation for spatial database applications, Computer Software and Applications Conference, 1999, COMPSAC '99, Proceedings, The Twenty–Third Annual International, Oct. 27–29, 1999, pp. 28–35.*

* cited by examiner

*Primary Examiner*—David Jung
(74) *Attorney, Agent, or Firm*—Charles E. Gotlieb

(57) ABSTRACT

A method and apparatus allows a file to be transferred from a mainframe computer to a client computer. A folder is set up on the client computer with a list of filenames and/or filters that designates some of the files on the mainframe computer as belonging to the folder. Conversion properties are assigned to the folder. A file is requested using the folder name and filename, and the file is transferred from the mainframe to the client computer and converted according to the properties of the folder to which the file belongs.

40 Claims, 4 Drawing Sheets

FIG. 4B

METHOD AND APPARATUS FOR CONVERTING FILES STORED ON A MAINFRAME COMPUTER FOR USE BY A CLIENT COMPUTER

RELATED APPLICATIONS

The subject matter of this application is related to the subject matter of application Ser. No. 09/441,795, entitled, "METHOD AND APPARATUS FOR ACCESS TO FILES STORED ON A MAINFRAME USING A PERSONAL COMPUTER USER INTERFACE", filed by Bruce Engle and Kevin Parker on Nov. 17, 1999; application Ser. No. 09/441,764, entitled, "METHOD AND APPARATUS FOR SERVING FILES FROM A MAINFRAME TO ONE OR MORE CLIENTS", filed by Bruce Engle and Kevin Parker on Nov. 17, 1999; and application Ser. No. 09/441,765, entitled, "SYSTEM AND METHOD FOR LOGGING INTO A MAINFRAME COMPUTER SYSTEM" filed on Nov. 17, 1999 by Bruce Engle and Kevin Parker, each having the same assignee as this application and each is incorporated herein by reference in its entirety.

FIELD OF THE INVENTION

The present invention is related to computer software and more specifically to remote file management computer software.

BACKGROUND OF THE INVENTION

Information in files that may reside on a mainframe computer, such as a S/390 computer system commercially available from IBM corporation of White Plains, N.Y., may be needed on a personal computer, such as a Pentium III compatible personal computer commercially available from Dell Computer Corporation of Round Rock, Tex. running the Windows NT operating system commercially available from Microsoft Corporation of Redmond Wash. The information in the files on the mainframe may be stored in a format different from that required on the personal computer.

It may be possible to prompt the user to specify the proper file conversions that must be performed when transferring to a personal computer some or all of a file stored on a mainframe, but requiring the user to supply such specifications is not always desirable for several reasons. First, the user may not know the proper specifications required for the file conversion. Second, the user may incorrectly specify the conversion, allowing the data transferred to the user to appear corrupted, causing user frustration.

What is needed is a method and apparatus that can automatically specify file conversions.

SUMMARY OF INVENTION

A method and apparatus allows the designation of a set of one or more files on a mainframe as belonging to a folder in a client computer system, and assigns one or more file conversion properties to each folder. When a portion of a file is requested, for example by using a folder name and the filename of the file, the portion of the file is converted according to the conversion properties for that folder and transferred from the mainframe to the client computer system. The portion of the file may be all of the file or less than all of the file. The file may be converted by removing padding characters, which may be performed before the file is transferred to the mainframe to enhance efficiency. The file may be converted by converting some or all of the characters in the file from EBCDIC to ASCII. If desired, conversion may only be performed on single byte characters of a multibyte character set. The folder may be specified using the folder name and filename, but may be specified in other ways, for example by using the filename and a drive designator that corresponds to the mainframe computer system. Because the designation of a file as being in a particular folder and the conversion properties of each folder can be local to a client computer system, each client computer system in a system of multiple client computer systems can arrange the same files on the mainframe computer system in a different manner and convert the files differently from other client computer systems. A single file may be designated as belonging to several folders, and converted differently depending on the folder used to identify the portion of the file for retrieval. If the file is altered at the client computer system, it may be returned to the mainframe computer system for storage. When the portion of the file is returned to the mainframe computer system, the file is converted back to its original format. The conversion back may be accomplished using the folder properties of the folder used to retrieve the file from the mainframe or a different conversion may be performed using folder properties of a different folder.

DETAILED DESCRIPTION OF A PREFERRED EMBODIMENT

Figure 1:
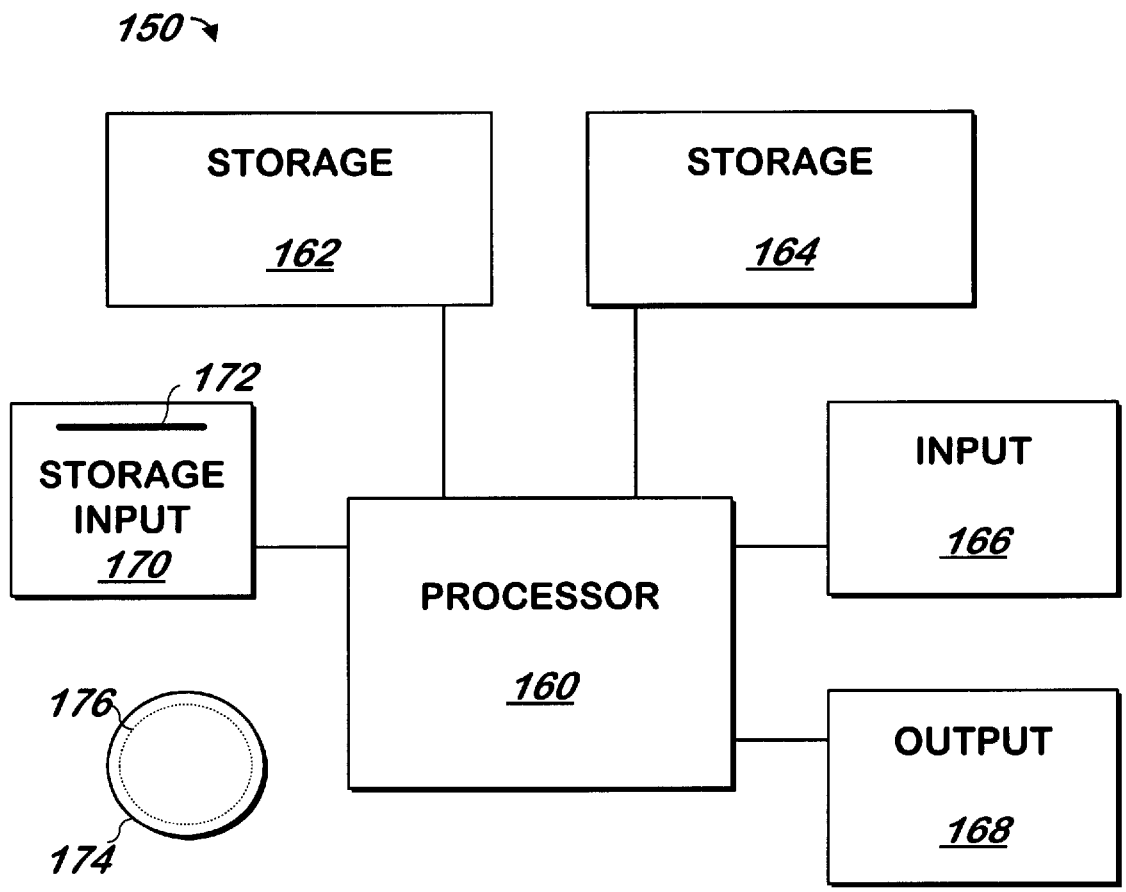
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be Used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Pentium III-compatible computer system commercially available from Dell Computer Corporation of Round Rock Tex. running the conventional Windows 95/98/NT operating system commercially available from Microsoft Corporation of Redmond, Wash., or a S/390 mainframe computer system running the conventional MVS operating system each commercially available from IBM Corporation of White Plains, N.Y., although other systems may be used.

Figure 2:
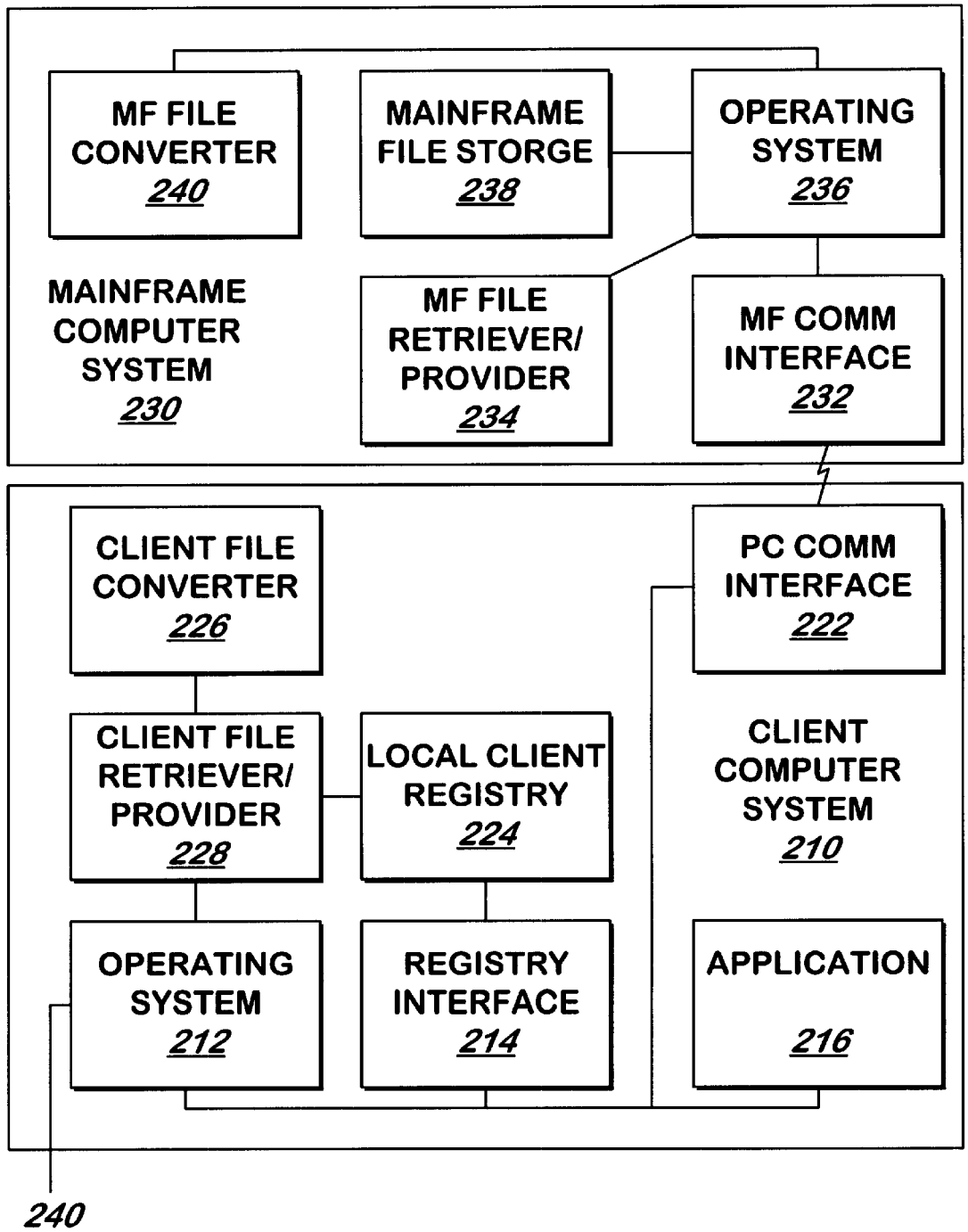
FIG. 2 is a block schematic diagram of an apparatus for transferring some or all of one or more computer files stored on a mainframe computer system to a client computer system according to one embodiment of the present invention.

Referring now to FIG. 2, an apparatus 200 for transferring some or all of one or more computer files stored on a mainframe computer system 230 to a client computer system 210 is shown according to one embodiment of the present invention. The apparatus 200 may also be used to convert the files from the client computer system 210 for storage on the mainframe computer system 230. In one embodiment, mainframe computer system 230 is a S/390 computer system running the MVS operating system commercially available from IBM Corporation of White Plains, N.Y., and the client computer system 210 is a Pentium-III compatible personal computer system such as the Dell Precision Workstation 610 commercially available from Dell Computer Corporation of Round Rock, Tex. running the Windows NT operating system commercially available from Microsoft Corporation of Redmond Wash., although other systems may be used for the client 210 or the mainframe 230 computer system.

Although only one client computer system 210 is shown coupled to mainframe computer system 230, other embodiments may have several client computer systems 210 (not shown) coupled to the same mainframe computer system 230. Any of these client computer systems 210 may be coupled to more than one mainframe computer system 230.

Client computer system 210 has input/output 240 which may be coupled to a conventional keyboard/monitor/mouse input/output device via operating system 212. Operating system 212 is coupled to registry interface 214.

Registry interface 212 provides a graphical user interface similar to the Windows Explorer interface that allows a user to set up folders on one or more logical drives that will represent the mainframe computer system 230 to the client computer system 210. Registry interface 214 is described in copending application Ser. No. 09/441,795. For example, the user can represent the mainframe computer system 230 as drive M: by setting up such a folder using registry interface 214. Registry interface 214 registers the drive letter to the operating system as described in copending application Ser. No. 09/441,795 so that operating system 212 will provide requests for data on that drive to client file retriever/provider 228. Registry interface 214 stores information mapping the drive letter to a communications channel to the mainframe computer system 230 in local client registry 224. The user then communicates with registry interface 214 via operating system 212 and input/output 240 to create one or more folders within the drive that represent the mainframe computer system 230. In one embodiment, registry interface 214 sets up each folder with a set of properties received from a user or other source such as a file, or default values provided by registry interface 214. In one embodiment, the folder properties include the name of the folder and path of the folder. In one embodiment, the properties of each folder also contain a list of dataset names or filters capable of describing multiple dataset names that describe some of the files stored on the mainframe computer system 230 that will be treated by client computer system 210 as being "in" the folder. In one embodiment, a folder contains less than all the files stored on the mainframe computer system 240, or less than all of the data files stored on the mainframe computer system 230. This allows the folder to appear to contain one or more files that are physically stored on the mainframe computer system 230 without appearing to contain all the files stored on the mainframe computer system 230 if the user so desires. Other properties of the folder describe how to handle conversion of each file in the folder or portion of such file. These properties are: 1) "mode", with possible values of "text" or "binary", 2) "character translation", with possible values of "true" or "false" and 3) "character set", with possible values of "multi byte" or "single byte".

Registry interface 214 stores the name and path of the folder and the properties of the folder into a local client registry 224 which may be an area of memory or disk. The other properties are, stored associated with the path and name of the folder for use as described below. The use of local registries allows each user to set up his or her own folders as that user prefers, even though the files "contained in" one user's folder may also be "in" a different folder on another user's system.

Application 216 is any conventional application program. When application 216 requires a portion of a file stored on the mainframe computer system 230, application 216 requests the file using operating system 212. The portion of the file may be some or all of the file. Operating system 212 uses the registration information for the drive representing the mainframe computer system 230 to send the request to client file retriever/provider 228.

Client file retriever/provider 228 receives the complete path of the file requested and uses the path to identify the folder "containing" the file. Client file retriever/provider 228 matches the path with one of the paths for the folders stored in local client registry 224. Client file retriever/provider 228 retrieves the file conversion properties for that folder from local client registry 224. Client file retriever/provider 228 passes the filename and the mode property of the folder in a command to mainframe file retriever/provider 234 along with an indicator stating the file is to be retrieved. The command is passed to mainframe file retriever/provider 234 on the mainframe computer system 230 via operating system 212, PC communications interface 222 and mainframe communications interface 232, which both are any communications interface such as LAN interface cards, and operating system 236.

In one embodiment, application 216 specifies in the command that it requires less than all of the file and an identifier of this portion is passed by operating system 212 to client file retriever/provider 228. Client file retriever/provider 228 passes an identifier of the portion requested to mainframe file retriever/provider 234 in the command.

Mainframe file retriever/provider 234, described in more detail in copending application serial number BB/BBB, BBB, retrieves from mainframe file storage 238 using operating system 236 the file or the requested portion of the file described in the command it receives.

If the mode property received in the command is text mode, the entire file or portion of the file or a handle thereto and an indication the file is being retrieved is passed to mainframe file converter 240 by mainframe file retriever/provider 234. Mainframe file converter 240 strips any EBCDIC spaces which can pad the end of each line and returns the file or portion of the file to mainframe file retriever/provider 234. In one embodiment, mainframe file converter 240 identifies the length of each line by requesting it from the data control block for the file from operating system 236. Mainframe file retriever/provider 234 sends the file to client file retriever/provider 228 via operating system 236, mainframe communication interface 232 PC communication interface 222 and operating system 212.

Client file retriever/provider 228 uses the character translation property of the folder to identify whether to translate the portion of the file it receives from EBCDIC to ASCII. If the character translation property is true, client file retriever/provider 228 sends the file or portion of the file received or handle thereto to client file converter 226 along with the character set property and an indication that the file is being received.

Client file converter 226 translates the file or portion according to the character set property. If the character set property has the value "single byte", client file translator 226 translates all characters in the file from EBCDIC to ASCII. If character set property is double byte, the characters in the file are interpreted as single bytes or double bytes according to the conventional Microsoft MultiByte Character Set, although other character sets can be used. The Multibyte character set is described at http://msdn.microsoft.com/library/devprods/vs6/visualc/vccore/_core_strings.3a_.unicode_and_mu ltibyte_character_set_.28.mbcs.29_.support.htm#_core_mfc_sup port_for_mbcs_strings. Client file converter 226 translates the single byte characters from EBCDIC to ASCII but does not translate double byte characters, identified using the shift out character in one embodiment.

Client file converter 226 then passes the file or portion of the file or a handle thereto to, or otherwise signals, client file retriever/provider 228. Client file retriever/provider 228 passes the file, portion or handle to operating system 212 which passes the file, portion or handle to application 216.

As shown and described herein, only one application requests files or portions thereof, however, any number of applications may be simultaneously requesting files. In such embodiment, client file retriever/provider 228 assigns an identifier such as a serial number to each command it creates and sends the serial number with the command. Mainframe file retriever/provider 234 returns this number with the file or portion thereof to allow client file retriever/provider 228 to send the appropriate file or portion to the appropriate application 216.

When application 216 is finished with the file or portion of the file it has received as described above, application 216 may signal operating system 212 to save the file. Application 216 may request the file be saved if application 216 has changed the file or for any other reason. Application 216 may instruct operating system 212 to save the file in the original location from where it was retrieved or may be saved in a different location. In either case, if the location is the drive corresponding to the mainframe computer system 230, operating system 212 signals client file retriever/provider 228 with the path of the folder in which the file or portion should be saved and a handle to the file or portion of the file, or the file or portion itself.

Client file retriever/provider 228 uses the identifier of the path it receives from operating system 212 to retrieve from local client registry 224 the folder properties for the folder specified in the path. Client file retriever/provider 228 provides the file/portion/handle it receives from operating system 212 and an indication that the file is being stored to client file converter 226. In one embodiment, the above step is always performed and client file retriever/provider 228 passes the character translation parameter and character set parameter to client file converter 226 as well. In another embodiment, client file retriever/provider 228 provides the file/portion/handle to client file converter 226 only if the character translation property is true, and client file retriever/provider passes only the character set parameter to client file converter 226.

Client file converter 226 performs the reverse of the translation specified above. If the character translation parameter is true and the character set property is single byte, client file converter 226 converts from ASCII to EBCDIC the portion of the file it receives, or the portion indicated by the handle. If the character translation parameter is true and the character set property is multi byte, client file converter 226 converts the file from ASCII to EBCDIC only for the single byte characters. If the character translation parameter is false, client file converter 226 does not convert the file. Client file converter 226 signals client file retriever/provider 228, which signals operating system 212 to send the file, converted according to the folder properties as described above, the file name and the mode property to mainframe file retriever/provider 234 along with an indication to store the portion of the file returned.

Operating system 212 sends the file, indication, filename and mode property via PC communications interface 222, mainframe communications interface 232 and operating system 236. In one embodiment, a communications process is maintained between mainframe file retriever/provider 234 and client file retriever provider using the above path to avoid the overhead of setting up and tearing down a communications path between client file retriever 228 and mainframe file retriever 234.

Mainframe file retriever/provider 234 investigates the mode property of the file. If the mode property is binary, mainframe file retriever/provider 234 provides the file or portion of the file to operating system 236 for storage in mainframe file storage 238. The file may be provided for storage as set forth in the related application Ser. No. 09/441,764.

If the mode property is text, mainframe file retriever/provider 234 provides the file or portion of the file or a handle thereto and an indication the file is being stored to mainframe file converter 240. Mainframe file converter 240 counts the number of characters in each line ending with ASCII carriage return and line feed characters or EBCDIC newline characters and inserts spaces to pad each line in the file to the length specified in the data control block for the file, which mainframe file converter 240 retrieves from operating system 236. If the file is a new file and no data control block exists for the file, mainframe file converter 240 uses a default value for the length, such as 79 or 80. In another embodiment, the default value for line length is specified as a characteristic in the registry 224. Client file retriever provider 228 provides to mainframe file retriever/provider 234 the default value with the mode characteristic.

Mainframe file retriever/provider 234 provides to mainframe file converter 240 the default value with the mode characteristic. If the file is new, mainframe file retriever provider 234 requests operating system 236 to set up a data control block using the value it receives as the line length and provides this value to mainframe file converter 240. Mainframe file converter 240 provides the converted file, portion or handle thereto, or otherwise signals, to mainframe file retriever/provider 234 for storage as described above.

As described herein, one or more conversions to the file or portion of the file are performed on the client computer system 210 or mainframe computer system 230. However, it isn't strictly necessary that the conversions described above be performed on the system 210 or 230 described above: any of the conversions may be performed on the other system 230 or 210. Performing the mode conversion on the mainframe computer system 230 can improve network efficiency because a fewer number of bytes need to be transmitted over the network connection between the communications interfaces 222, 232 with the padding characters removed. Performing the ASCII/EBCDIC conversion in the client computer system 210 can off load processing requirements from the mainframe computer system 230.

Figure 3A:
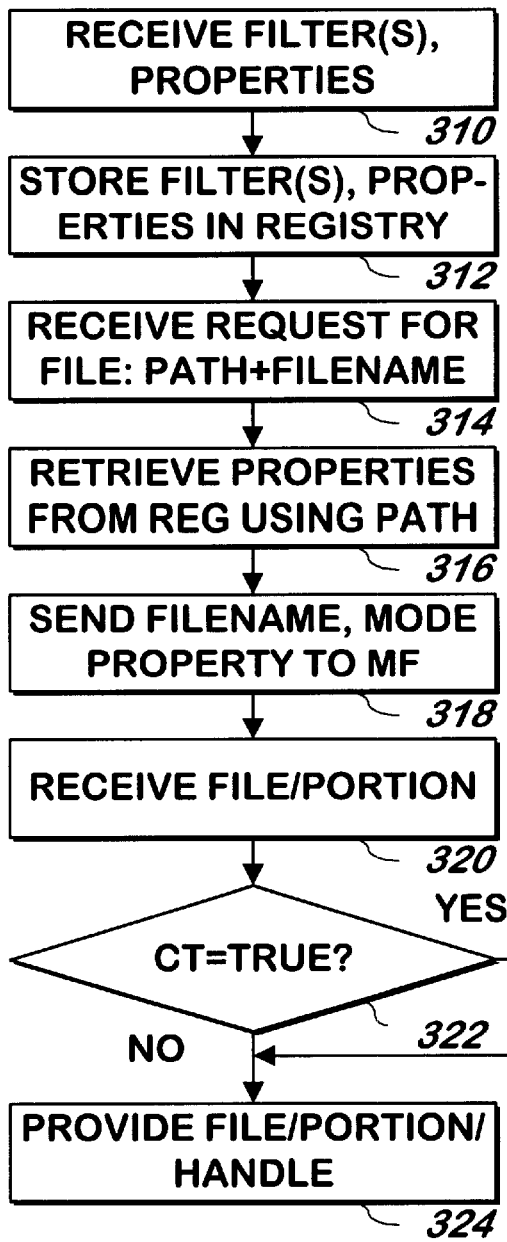
FIG. 3A is a flowchart illustrating a method of requesting a portion of a file stored on a mainframe computer system for use on a personal computer system according to one embodiment of the present invention.

Referring now to FIG. 3A, a method of requesting a portion of a file stored on a mainframe computer system for use on a personal computer system is shown according to one embodiment of the present invention. The portion may be some or all of the file. One or more filters and properties as described above are received 310. The filters are made of file names, or other descriptors that identify a set of one or more files that are to be considered as included "in" the folder. The filters may define sets of files using wildcards such as "EEF.*" to mean all files having filenames starting with "EEF". The filters and properties of the folder are stored 312 in a registry associated with the folder name and path of the folder with other filters and properties of other folders similarly defined.

A request for a file is received 314. The request for the file includes a path and filename in one embodiment. The properties associated with the folder having the path received in step 314 are retrieved 316 from the registry. The filename received in step 314 and the mode property retrieved in step 316 are transmitted 318 to a mainframe computer across a network. In one embodiment, the request received in step 314 also includes an identifier of a portion of the file, and the portion identifier is also transmitted to the mainframe as part of step 318.

The file or requested portion is received 320 as described above with respect to FIG. 2 and below with respect to FIG. 3B. If the character translation property retrieved in step 316 is not true 322, the file or portion received in step 320 or a handle thereto is provided 324, for example to the application from which the request was received in step 314.

If the character translation property received in step 316 is true 322, the method continues at step 330. At step 330, if the character set parameter retrieved in step 316 corresponds to the multi-byte character set 330, single bytes in the file or portion of the file received in step 320 are converted 332 to ASCII as described above and the method continues at step 334. Otherwise, all bytes in the file or portion of the file received in step 320 are converted 334 to ASCII and the method continues at step 324.

Figure 3B:
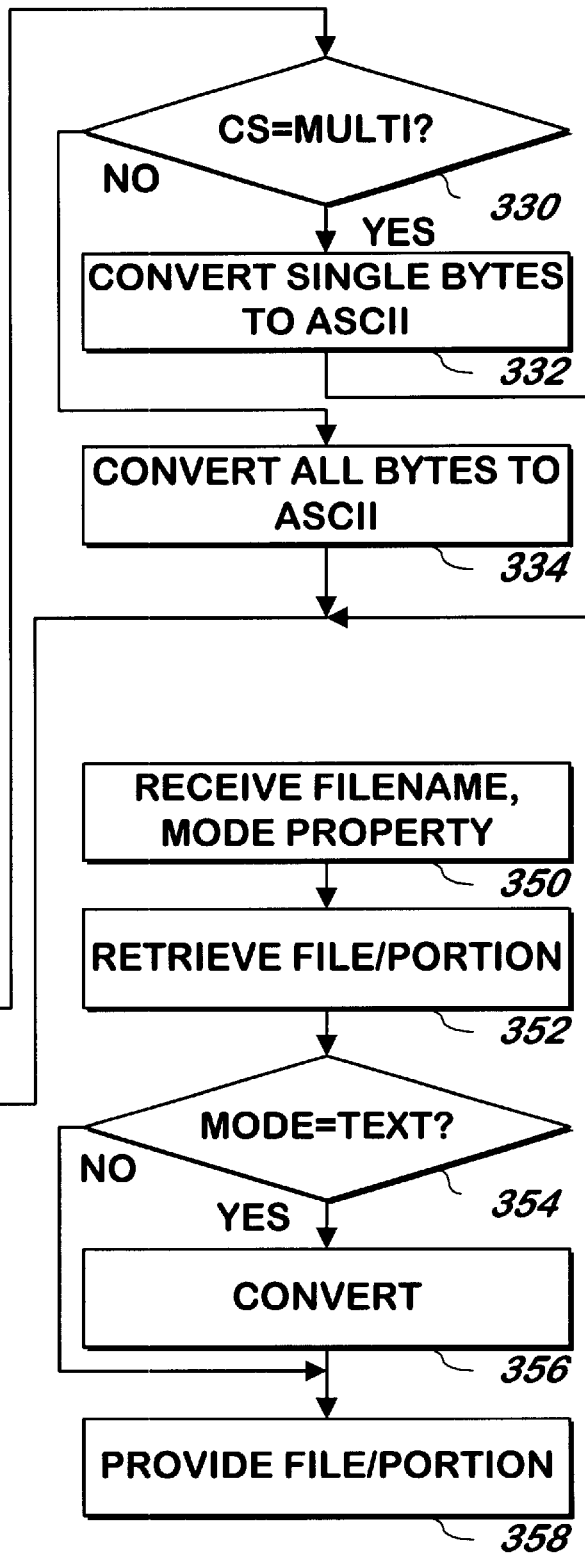
FIG. 3B is a flowchart illustrating a method of providing a requested portion of a file according to one embodiment of the present invention.

Referring now to FIG. 3B, a method of providing a requested portion of a file is shown according to one embodiment of the present invention. The method of FIG. 3B is performed in between steps 318 and 320 of FIG. 3A in one embodiment of the present invention.

The filename and mode property are received 350. In one embodiment step 350 also includes receiving an identifier of a portion of the file desired. The file or portion of the file corresponding to the filename and identifier of any portion is retrieved 352. If the mode parameter received in step 350 is text 354, the file is converted 356 as described above to remove padded spaces. The file or portion retrieved in step 352 or specified in step 350 or another portion corresponding to one of these portions is provided 358 from a mainframe to a personal computer. If the mode parameter is not text 354, the method continues at step 358.

Figure 4A:
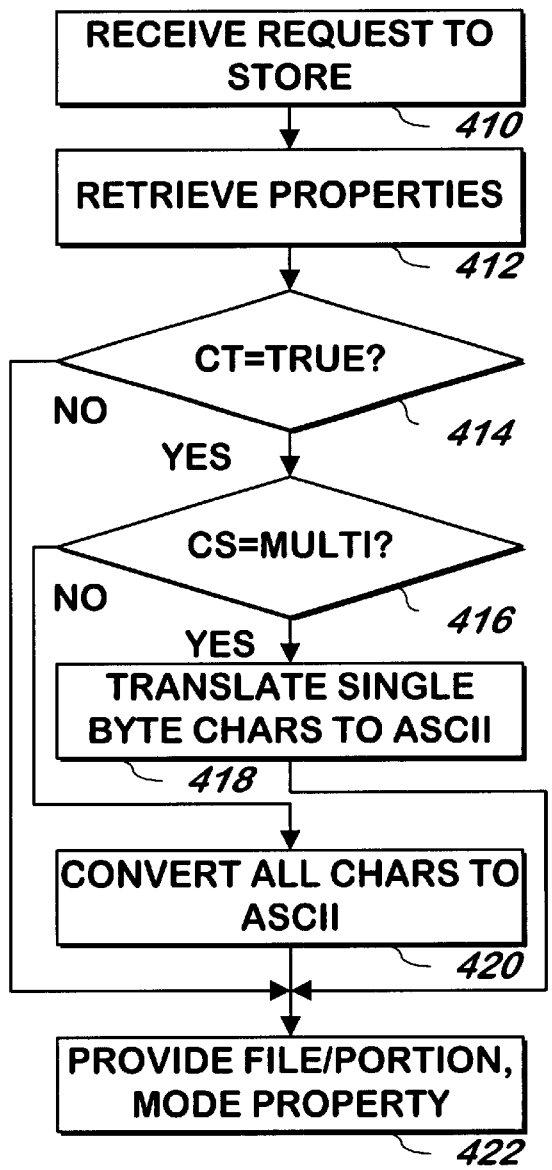
FIG. 4A is a flowchart illustrating a method of preparing on a client computer system a portion of a file for storage onto a mainframe computer system according to one embodiment of the present invention.

Referring now to FIG. 4A, a method of preparing on a client computer system a portion of a file to be stored onto a mainframe computer system is shown according to one embodiment of the present invention. A request to store a file or portion of a file is received 410. If the request is for a portion of a file, the portion may be identified in the request (e.g. records 4–8). The request may contain or imply a path and filename.

Properties are retrieved 412 as described above. The properties are retrieved using the path of the request received in step 410. If the character translation property retrieved in step 412 is true 414, the method continues at step 416, otherwise the method continues at step 422, each described below. If the character set property is multi byte 416, single byte characters in the file or portion of the file corresponding to the request received in step 410 are translated 418 from ASCII to EBCDIC as described above and the method continues at step 422, otherwise all characters in the file or portion of the file corresponding to the request received in step 410 are translated 420 from ASCII to EBCDIC as described above, and the method continues at step 422. At step 422, the file or portion of the file is stored as described above.

Figure 4B:
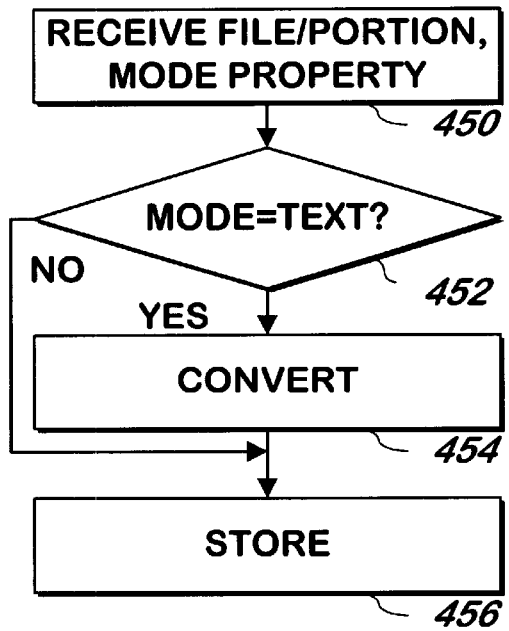
FIG. 4B is a flowchart illustrating a method of preparing on a client computer system a portion of a file for storage on a mainframe computer system according to one embodiment of the present invention.

Referring now to FIG. 4B, a method of storing a portion of a file on a mainframe computer system is shown according to one embodiment of the present invention. The portion of the file may be some or all of the file. The steps of FIG. 4B are performed after step 422 of FIG. 4A in one embodiment of the present invention.

The file or portion of the file to be stored is received 450 along with the mode property described above. In one embodiment, if a portion of a file is received in step 450, an identifier describing where the portion received is to be inserted may be received as part of step 450.

If the mode property received in step 450 is text 452, the file is converted 454 to binary mode as described above, and the method continues at step 456, otherwise the method continues at step 456. At step 456, the file or portion is stored as described above.

What is claimed is:

1. A method of transferring a portion of a file from a first computer to a second computer, the method comprising:

receiving at the second computer a description of a set of a plurality of files, the set comprising the file and less than all files on the first computer;

associating at least one property with the set of the plurality of files so that the at least one property is associated with all of the plurality of files in the set;

receiving a request to transfer the portion of the file, the request comprising an identifier of the set of the plurality of files and an identifier of the file;

retrieving at least one of the at least one property responsive to the identifier of the set received;

providing the portion of the file from the first computer to the second computer; and altering the portion of the file responsive to the at least one property retrieved.

2. The method of claim 1 wherein the portion is all of the file.

3. The method of claim 1 wherein altering the portion of the file comprises removing at least one padding character from the file.

4. The method of claim 3 wherein the providing step is performed after the removing step.

5. The method of claim 1 wherein altering the portion of the file comprises converting at least one character in the file from EBCDIC to ASCII.

6. The method of claim 5 wherein the at least one character is converted responsive to at least one shift character in the file.

7. The method of claim 1 wherein the identifier of the set of the plurality of files comprises a path and the identifier of the file comprises a filename.

8. The method of claim 7 wherein the path comprises a drive designator corresponding to the first computer.

9. The method of claim 1, additionally comprising:
receiving at a third computer a description of an additional set of at least one file different from the set of the plurality of files, the additional set comprising the file and less than all files on the first computer;
associating at least one property with the additional set of at least one file;
receiving an additional request to provide the portion of the file, the additional request comprising an identifier of the additional set of at least one file and an identifier of the file;
retrieving at least one of the at least one property associated with the additional set of at least one file responsive to the identifier of the additional set received;
providing the portion of the file from the first computer to the third computer; and
altering the portion of the file responsive to the at least one property retrieved.

10. The method of claim 1 comprising the additional steps of:
receiving at the second computer an additional description of an additional set of at least one file, the set comprising the file and less than all files on the first computer;
associating at least one property with the additional set of at least one file, at least one of the at least one property associated with the additional set of at least one file different from the at least one property associated with the set of the plurality of files;
receiving a request to provide the portion of the file, the request comprising an identifier of the additional set of at least one file and an identifier of the file;
retrieving at least one of the at least one property responsive to the identifier of the additional set received;
providing the portion of the file from the first computer to the second computer; and
altering the portion of the file responsive to the at least one property of the additional set of at least one file retrieved.

11. The method of claim 1, additionally comprising the steps of:
changing the portion of the file; and
storing the changed portion of the file in place of the portion of the file provided.

12. The method of claim 11 additionally comprising altering the changed portion of the file responsive to at least one of the at least one property retrieved.

13. The method of claim 11 additionally comprising:
receiving an identifier of an alternate set of at least one file, the set having at least one property; and wherein the storing the changed portion is responsive to at least one of the at least one property of the alternate set of at least one file.

14. The method of claim 1, wherein the first computer is a mainframe computer and the second computer is a personal computer.

15. A computer program product comprising a computer useable medium having computer readable program code embodied therein for providing a portion of a file from a first computer to a second computer, the computer program product comprising:
computer readable program code devices configured to cause a computer to receive at the second computer a description of a set of a plurality of files, the set comprising the file and less than all files on the first computer;
computer readable program code devices configured to cause a computer to associate at least one property with the set of the plurality of files so that the at least one property is associated with all of the plurality of files in the set;
computer readable program code devices configured to cause a computer to receive a request to provide the portion of the file, the request comprising an identifier of the set of the plurality of files and an identifier of the file;
computer readable program code devices configured to cause a computer to retrieve at least one of the at least one property responsive to the identifier of the set received;
computer readable program code devices configured to cause a computer to provide the portion of the file from the first computer to the second computer; and
computer readable program code devices configured to cause a computer to alter the portion of the file responsive to the at least one property retrieved.

16. The computer program product of claim 15 wherein the portion is all of the file.

17. The computer program product of claim 15 wherein the computer readable program code devices configured to cause a computer to alter the portion of the file comprise computer readable program code devices configured to cause a computer to remove at least one padding character from the file.

18. The computer program product of claim 17 wherein the computer readable program code devices configured to cause a computer to provide operate after the computer readable program code devices configured to cause the computer to remove.

19. The computer program product of claim 15 wherein the computer readable program code devices configured to cause a computer to alter the portion of the file comprise computer readable program code devices configured to cause a computer to convert at least one character in the file from EBCDIC to ASCII.

20. The computer program product of claim 19 wherein the computer readable program code devices configured to cause a computer to convert at least one character are responsive to at least one shift character in the file.

21. The computer program product of claim 15 wherein the identifier of the set of the plurality of files comprises a path and the identifier of the file comprises a filename.

22. The computer program product of claim 21 wherein the path comprises a drive designator corresponding to the first computer.

23. The computer program product of claim 15, additionally comprising:
   computer readable program code devices configured to cause a computer to receive at a third computer a description of an additional set of at least one file different from the set of the plurality of files, the additional set comprising the file and less than all files on the first computer;
   computer readable program code devices configured to cause a computer to associate at least one property with the additional set of at least one file;
   computer readable program code devices configured to cause a computer to receive an additional request to provide the portion of the file, the additional request comprising an identifier of the additional set of at least one file and an identifier of the file;
   computer readable program code devices configured to cause a computer to retrieve at least one of the at least one property associated with the additional set of at least one file responsive to the identifier of the additional set received;
   computer readable program code devices configured to cause a computer to provide the portion of the file from the first computer to the third computer; and
   computer readable program code devices configured to cause a computer to alter the portion of the file responsive to the at least one property retrieved.

24. The computer program product of claim 15 additionally comprising:
   computer readable program code devices configured to cause a computer to receive at the second computer an additional description of an additional set of at least one file, the set comprising the file and less than all files on the first computer;
   computer readable program code devices configured to cause a computer to associate at least one property with the additional set of at least one file, at least one of the at least one property associated with the additional set of at least one file different from the at least one property associated with the set of the plurality of files;
   computer readable program code devices configured to cause a computer to receive a request to provide the portion of the file, the request comprising an identifier of the additional set of at least one file and an identifier of the file;
   computer readable program code devices configured to cause a computer to retrieve at least one of the at least one property responsive to the identifier of the additional set received;
   computer readable program code devices configured to cause a computer to provide the portion of the file from the first computer to the first computer; and
   computer readable program code devices configured to cause a computer to alter the portion of the file responsive to the at least one property of the additional set of at least one file retrieved.

25. The computer program product of claim 15, additionally comprising:
   computer readable program code devices configured to cause a computer to change the portion of the file; and
   computer readable program code devices configured to cause a computer to store the changed portion of the file in place of the portion of the file provided.

26. The computer program product of claim 25 additionally comprising computer readable program code devices configured to cause a computer to alter the changed portion of the file responsive to at least one of the at least one property retrieved.

27. The computer program product of claim 25 additionally comprising:
   computer readable program code devices configured to cause a computer to receive an identifier of an alternate set of at least one file, the set having at least one property; and wherein
   the computer readable program code devices configured to cause a computer to store the changed portion is responsive to at least one of the at least one property of the alternate set of at least one file.

28. The computer program product of claim 15 wherein the first computer is a mainframe computer and the second computer is a personal computer.

29. An apparatus for providing a portion of a file from a first computer to a second computer, the apparatus comprising:
   a registry interface at the second computer having an input operatively coupled to receive a description of a set of a plurality of files, the set comprising the file and less than all files on the first computer, the registry interface for associating and providing at an input/output the at least one property responsive to an identifier of the set of the plurality of files received at the input/output so that the at least one property is associated with all of the plurality of files in the set;
   a client file retriever/provider having a first input operatively coupled to receive a request to provide the portion of the file, the request comprising the identifier of the set of the plurality of files and an identifier of the file, the client file retriever/provider for providing at a first input/output the identifier of the set received and receiving at the client file retriever/provider first input/output at least one of the at least one property, for providing at a second input/output coupled to the first computer a command for a portion of the file; and
   a client file converter having a first input coupled to the first computer for receiving the portion of the file, and a second input coupled to the registry interface for receiving at least one of the at least one property, the client file converter for altering the portion of the file responsive to the at least one property received at the second input and for providing at an output coupled to an apparatus output the altered portion of the file.

30. The apparatus of claim 29 wherein the at least one property received at the client file converter second input corresponds to the identifier of the set received at the client file retriever/provider first input.

31. The apparatus of claim 29 wherein the portion is all of the file.

32. The apparatus of claim 29 additionally comprising a file converter having an input operatively coupled to receive the portion of the file, the file converter for, responsive to an indicator of at least one of the at least one properties received at an input coupled to the registry interface input/output:
   removing at least one padding character from the file; and
   providing the portion of the file with the at least one padding character removed to an coupled to the client file retriever/provider first input/output.

33. The apparatus of claim 32 wherein the file converter is located at the first computer.

34. The apparatus of claim 29 wherein the client file converter alters the file by converting at least one character in the file from EBCDIC to ASCII.

35. The apparatus of claim 34 wherein the client file converter converts the at least one character responsive to at least one shift character in the file.

36. The apparatus of claim 34 wherein the identifier of the set of at least one file comprises a path and the identifier of the file comprises a filename.

37. The apparatus of claim 36 wherein the path comprises a drive designator corresponding to the first computer.

38. The apparatus of claim 29 wherein the client file converter has a second input for receiving a modified portion corresponding to the portion of the file, the client file converter additionally for altering the modified portion responsive to at least one of the at least one property received at the client file converter second input and providing the altered modified portion to an altered modified portion output coupled to the first computer.

39. The apparatus of claim 38 wherein the at least one property received at the client file converter second input corresponds to the identifier of the set of the plurality of files received at the client file provider/retriever first input.

40. The apparatus of claim 38 wherein the at least one property received at the client file converter second input corresponds to the identifier of a set of at least one file different from the set of the plurality of files received at the client file provider/retriever first input.

* * * * *

UNITED STATES PATENT AND TRADEMARK OFFICE
CERTIFICATE OF CORRECTION

PATENT NO. : 6,691,125 B1  Page 1 of 1
DATED : February 10, 2004
INVENTOR(S) : Bruce Engle and Kevin Parker It is certified that error appears in the above-identified patent and that said Letters Patent is hereby corrected as shown below:

<u>Column 13,</u>
Line 4, "claim 34" should read -- claim 29 --.

Signed and Sealed this

Thirteenth Day of April, 2004

JON W. DUDAS
*Acting Director of the United States Patent and Trademark Office*